(12) United States Patent
Abe et al.

(10) Patent No.: US 10,909,087 B2
(45) Date of Patent: Feb. 2, 2021

(54) ROLLBACK ON A SEQUENTIAL STORAGE MEDIUM TO A SPECIFIC POINT IN TIME

(71) Applicant: International Business Machines Corporation, Armonk, NY (US)

(72) Inventors: Atsushi Abe, Ebina (JP); Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 15/878,235

(22) Filed: Jan. 23, 2018

(65) Prior Publication Data

US 2019/0228080 A1 Jul. 25, 2019

(51) Int. Cl.
*G06F 12/00* (2006.01)
*G06F 16/18* (2019.01)
*G06F 3/06* (2006.01)
*G11B 5/008* (2006.01)

(52) U.S. Cl.
CPC ........ *G06F 16/1873* (2019.01); *G06F 3/0604* (2013.01); *G06F 3/065* (2013.01); *G06F 3/0619* (2013.01); *G06F 3/0682* (2013.01); *G06F 12/00* (2013.01); *G06F 16/1815* (2019.01); *G11B 5/00813* (2013.01)

(58) Field of Classification Search
CPC .............................. G06F 12/00; G06F 16/1873
USPC .......................................................... 711/111
See application file for complete search history.

(56) References Cited

U.S. PATENT DOCUMENTS

| | | | | |
|---|---|---|---|---|
| 8,527,561 B1* | 9/2013 | Moody, II | ............. | G06F 3/0605 707/822 |
| 2014/0108720 A1* | 4/2014 | Abe | ..................... | G11B 27/107 711/111 |
| 2015/0149415 A1* | 5/2015 | Iwanaga | ............. | G06F 16/2228 707/684 |
| 2016/0344834 A1 | 11/2016 | Das | | |
| 2017/0344562 A1* | 11/2017 | Iwanaga | ............... | G06F 16/116 |

* cited by examiner

*Primary Examiner* — Gautam Sain
(74) *Attorney, Agent, or Firm* — Zilka-Kotab, P.C.

(57) ABSTRACT

A computer-implemented method according to one embodiment includes creating journal entries in response to performing predetermined operations on a sequential storage medium, storing the journal entries in a memory in response to creation thereof for creating an operation journal, and upon occurrence of a predefined event, saving the operation journal. A computer program product according to another embodiment includes a computer readable storage medium having program instructions embodied therewith. The computer readable storage medium is not a transitory signal per se. The program instructions are readable and/or executable by a controller to cause the controller to perform a method including creating, by the controller, journal entries in response to performing predetermined operations on a sequential storage medium. The journal entries are stored, by the controller, in a memory in response to creation thereof for creating an operation journal. The operation journal is saved upon occurrence of a predefined event.

18 Claims, 12 Drawing Sheets

US 10,909,087 B2

1

ROLLBACK ON A SEQUENTIAL STORAGE MEDIUM TO A SPECIFIC POINT IN TIME

BACKGROUND

The present invention relates to data storage systems, and more particularly, this invention relates to enabling and/or performing rollback on a sequential storage medium to a specific point in time.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Data of such data storage libraries is often organized and accessed in accordance with a file system such as Linear Tape File System (LTFS). LTFS may be implemented by storing data on a storage medium, such as a sequential storage medium, in a format conforming to LTFS.

As data is written to a sequential storage medium, previous versions of data may be updated, where information about the updates is recorded in an index following the latest-written data on the sequential storage medium. Accordingly, upon mounting a sequential storage medium, such indexes may note where most current versions of data reside along the sequential storage medium, and thereby enable reproduction of the latest version of the data.

SUMMARY

A computer-implemented method according to one embodiment includes creating journal entries in response to performing predetermined operations on a sequential storage medium, storing the journal entries in a memory in response to creation thereof for creating an operation journal, and upon occurrence of a predefined event, saving the operation journal.

A computer program product according to another embodiment includes a computer readable storage medium having program instructions embodied therewith. The computer readable storage medium is not a transitory signal per se. The program instructions are readable and/or executable by a controller to cause the controller to perform a method including creating, by the controller, journal entries in response to performing predetermined operations on a sequential storage medium. The journal entries are stored, by the controller, in a memory in response to creation thereof for creating an operation journal. The operation journal is saved, by the controller, upon occurrence of a predefined event.

A computer-implemented method according to yet another embodiment includes using information in an operation journal to perform a rollback operation on a sequential storage medium to a specific point in time in response to receiving a request to perform the rollback operation.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes creating journal entries in response to performing predetermined operations on a sequential storage medium, storing the journal entries in a memory in response to creation thereof for creating an operation journal, and upon occurrence of a predefined event, saving the operation journal.

In another general embodiment, a computer program product includes a computer readable storage medium having program instructions embodied therewith. The computer readable storage medium is not a transitory signal per se. The program instructions are readable and/or executable by a controller to cause the controller to perform a method including creating, by the controller, journal entries in response to performing predetermined operations on a sequential storage medium. The journal entries are stored, by the controller, in a memory in response to creation thereof for creating an operation journal. The operation journal is saved, by the controller, upon occurrence of a predefined event.

In another general embodiment, a computer-implemented method includes using information in an operation journal to perform a rollback operation on a sequential storage medium to a specific point in time in response to receiving a request to perform the rollback operation.

Figure 1:
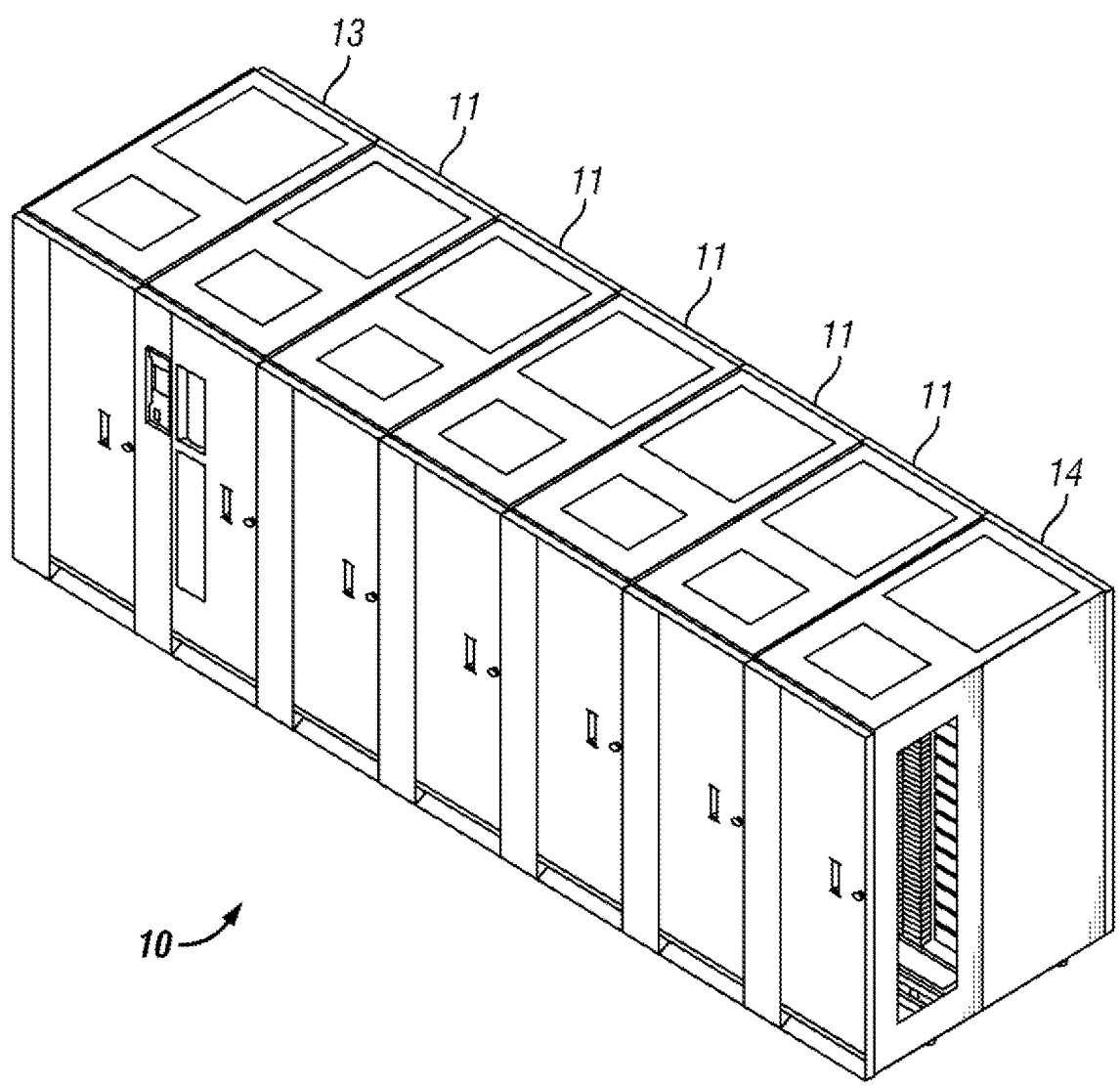
FIG. 1 is a perspective view of an automated data storage library according to one embodiment.
Figure 2:
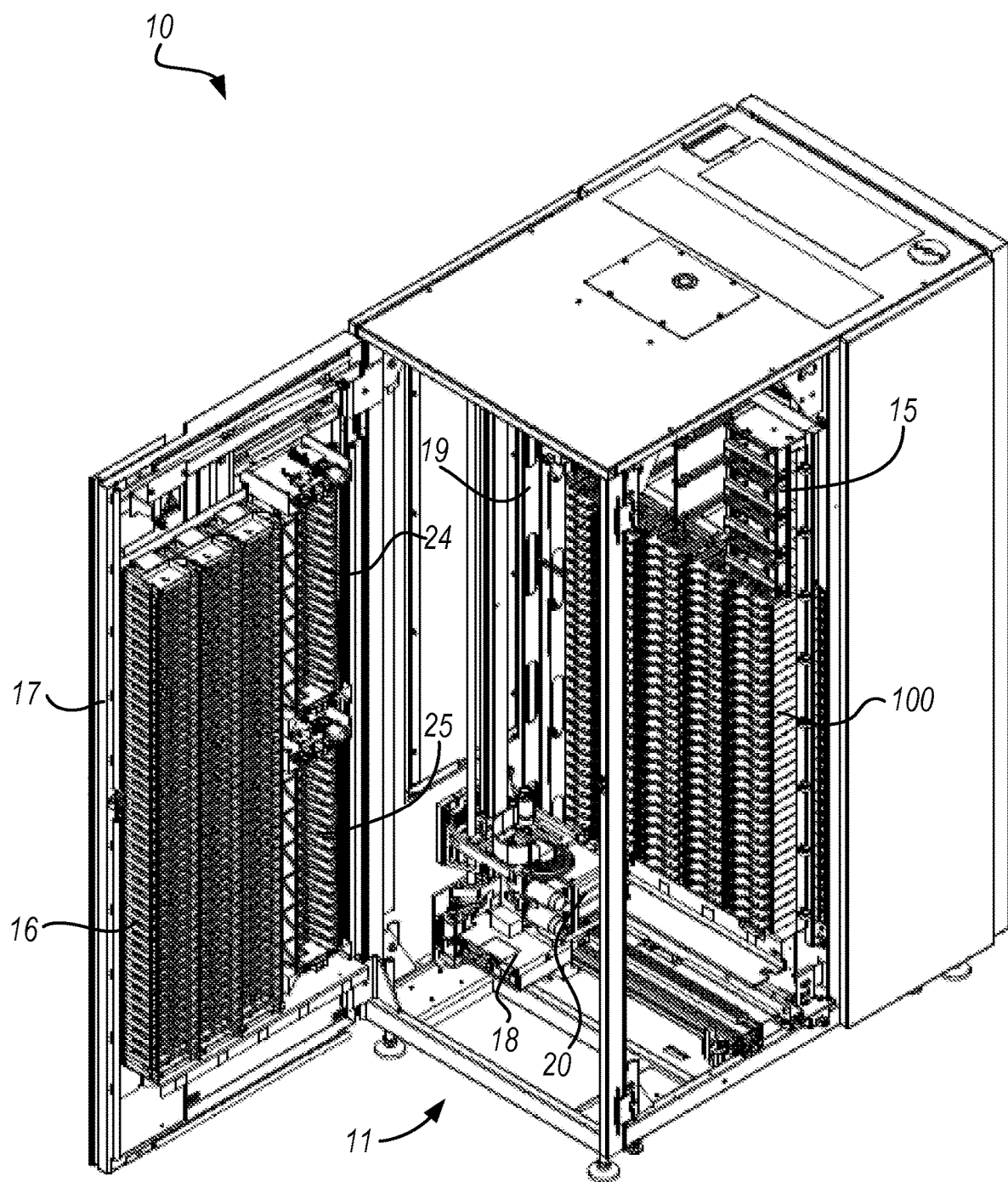
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
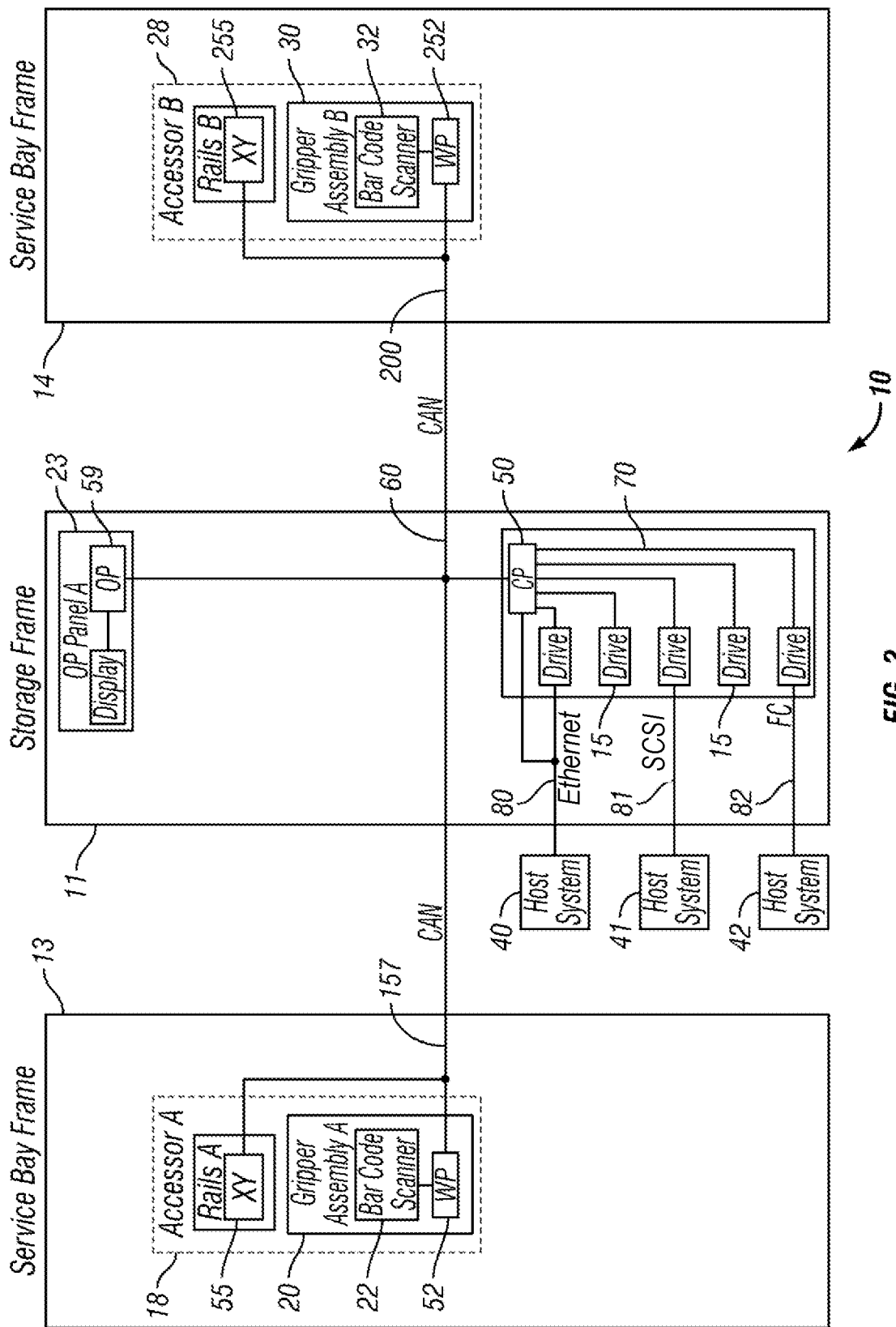
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42.

Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
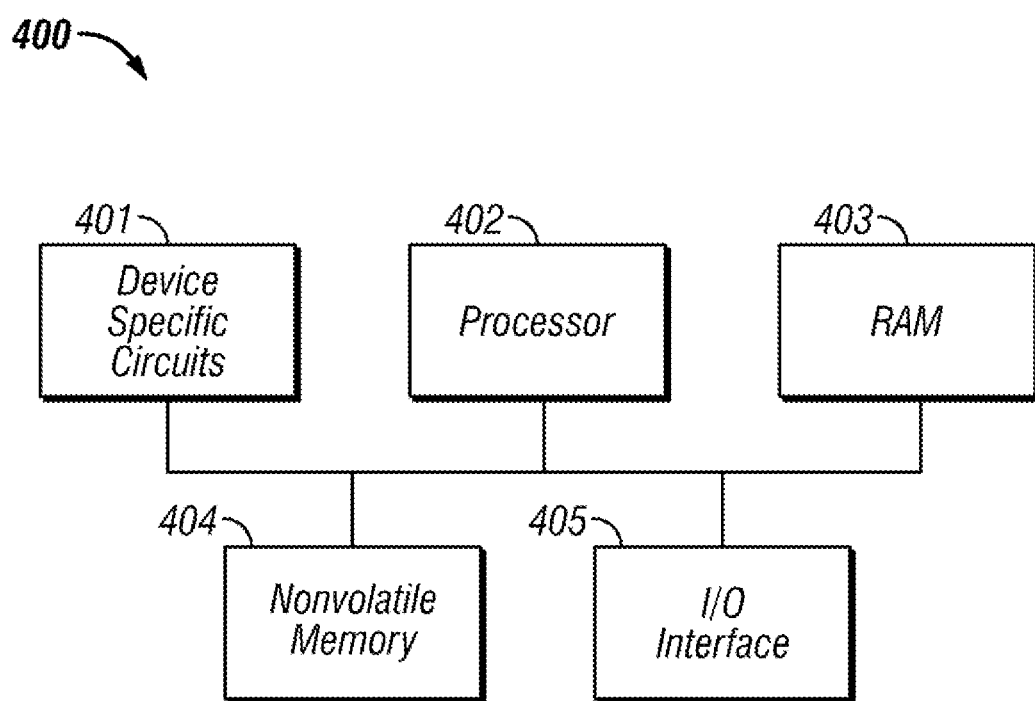
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
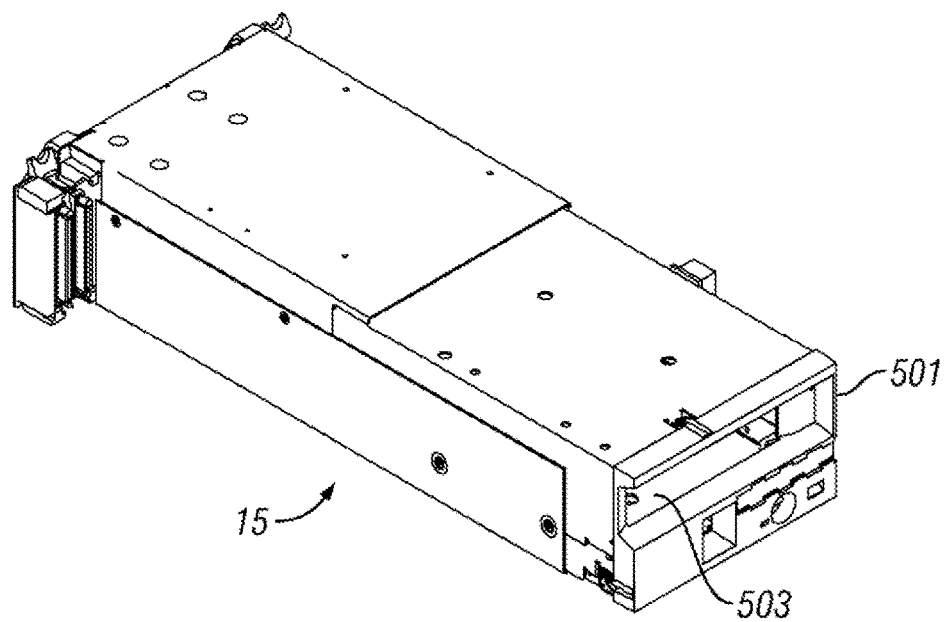
FIG. 5A is a front perspective view of a data storage drive according to one embodiment.
Figure 5B:
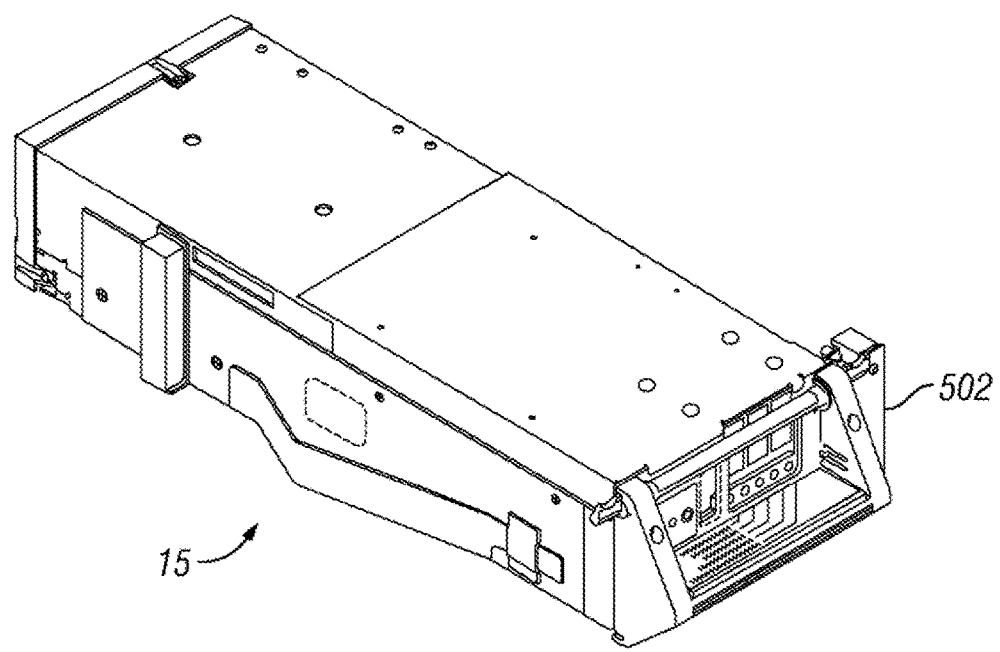
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
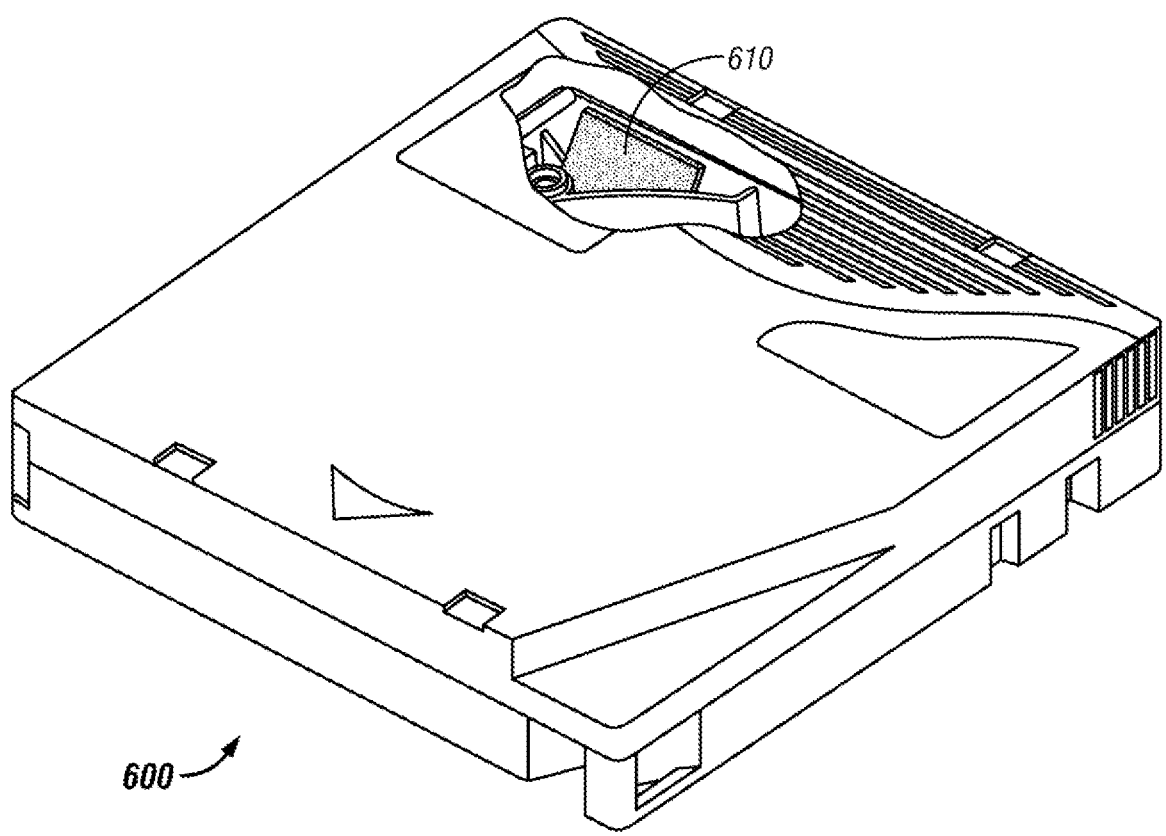
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
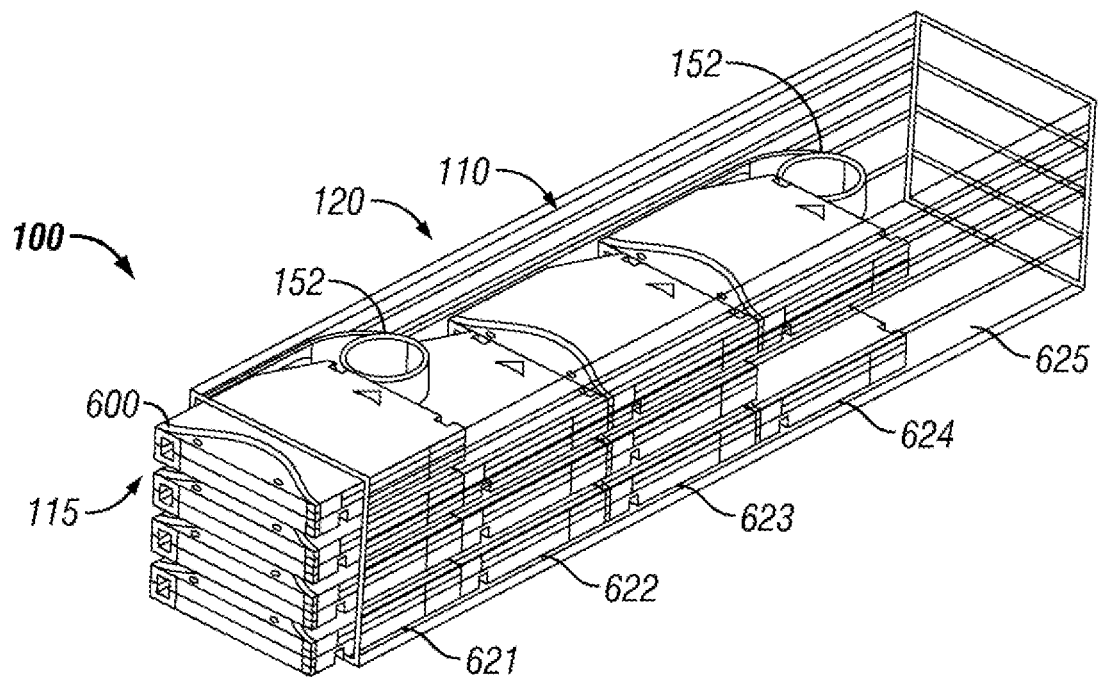
FIGS. 7A-7B are perspective views of a multi-cartridge deep slot cell according to one embodiment.
Figure 7B:
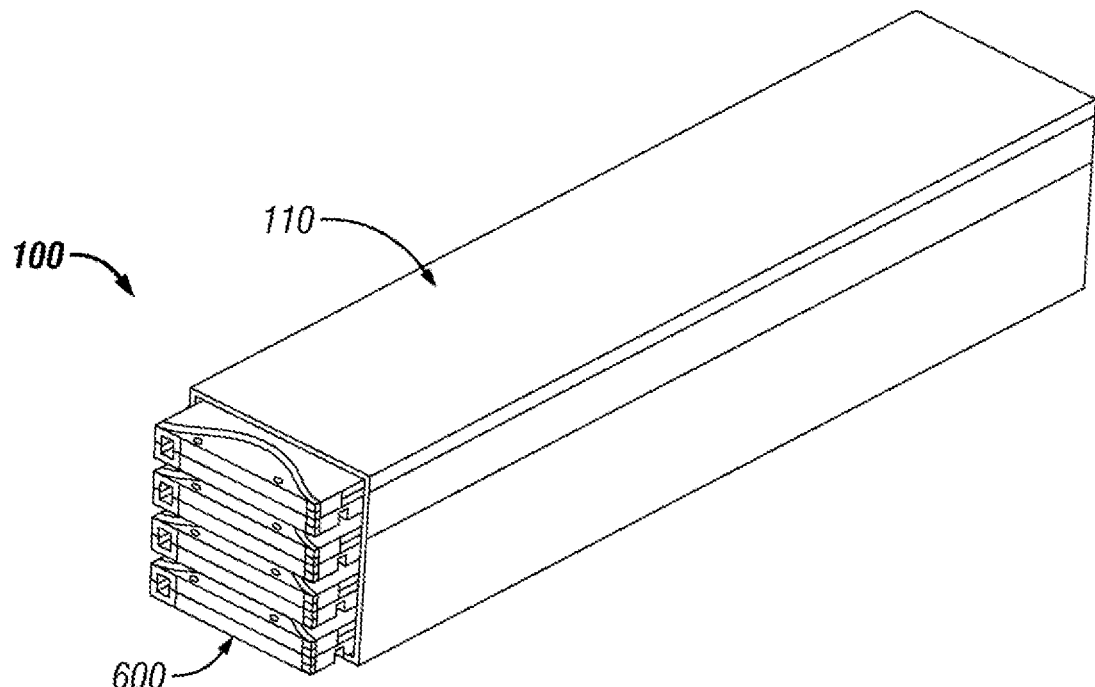

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

In accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 8:
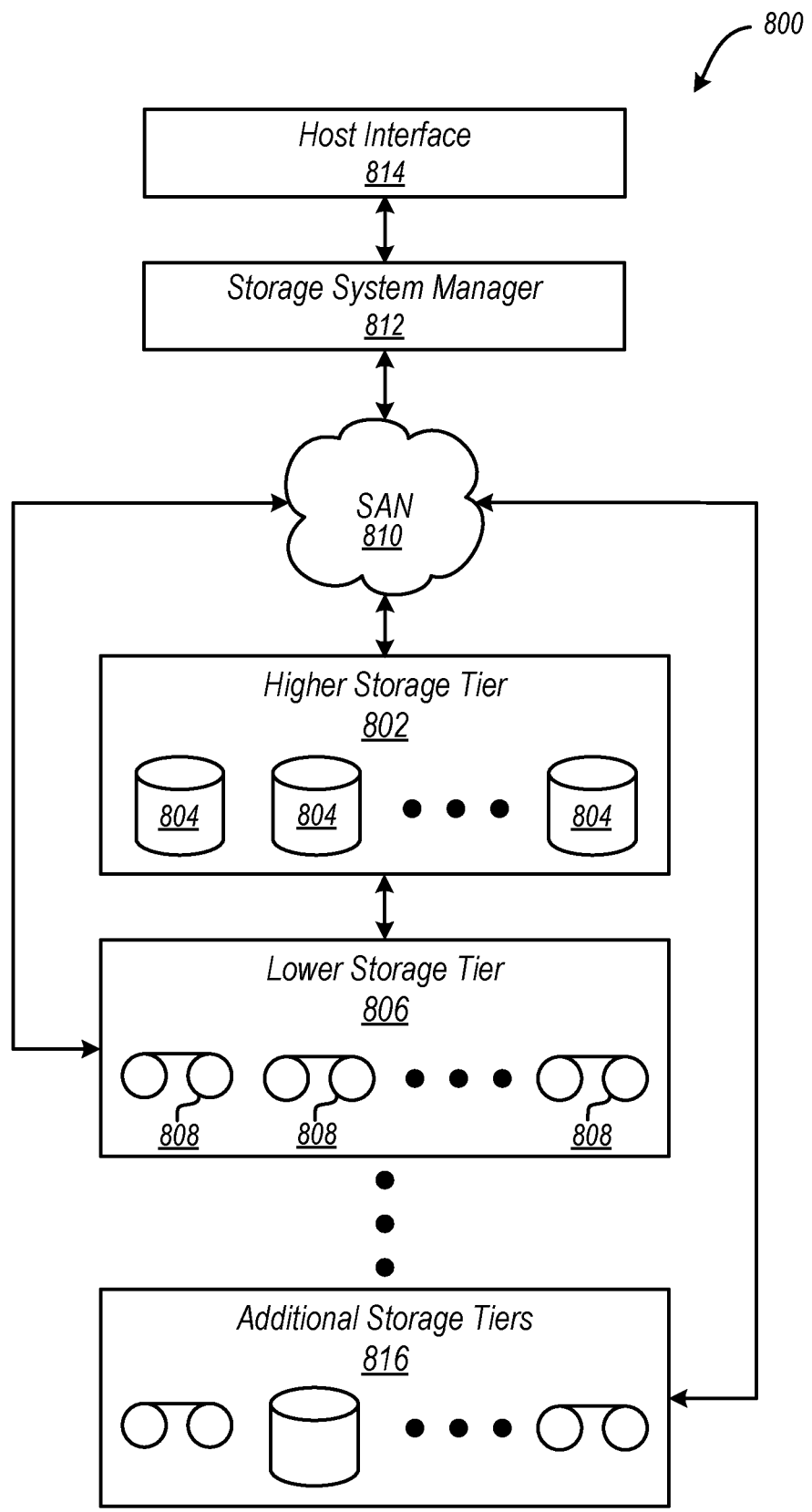
FIG. 8 illustrates a tiered data storage system in accordance with one embodiment.

Now referring to FIG. 8, a storage system 800 is shown according to one embodiment. Note that some of the elements shown in FIG. 8 may be implemented as hardware and/or software, according to various embodiments. In some approaches, the storage system 800 may be implemented in an automated data storage library such as that shown in FIGS. 1-2. In other approaches, an automated data storage library such as that shown in FIGS. 1-2 may be a tier of the storage system 800.

The storage system 800 may include a storage system manager 812 for communicating with a plurality of media on at least one higher storage tier 802 and at least one lower storage tier 806. The higher storage tier(s) 802 preferably may include one or more random access and/or direct access media 804, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 806 may preferably include one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Also, any of the higher storage tiers 802 and/or the lower storage tiers 806 may include some combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions. Of course, this logic may be implemented as a method on any device and/or system or as a computer program product, according to various embodiments.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
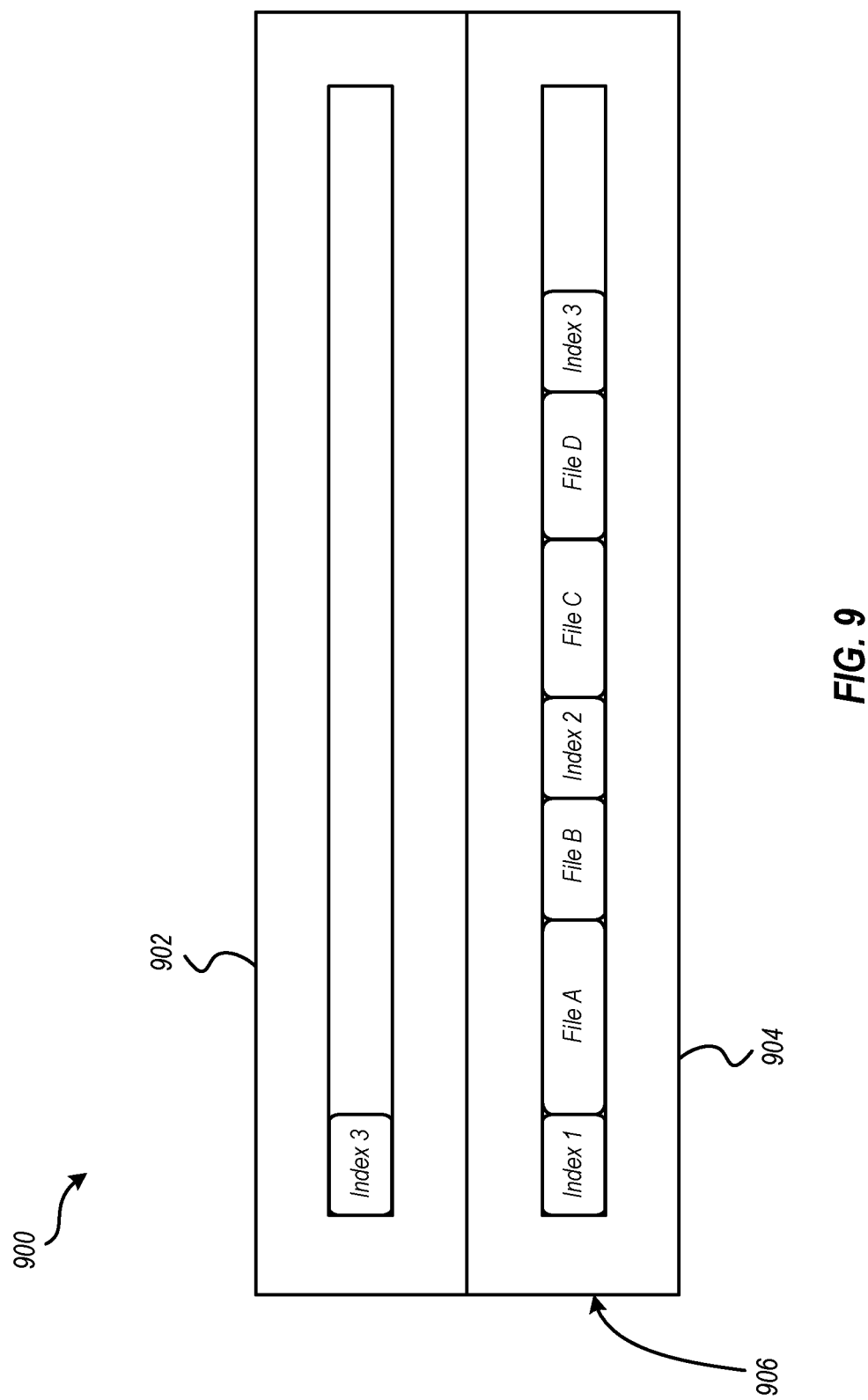
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

Conventional data storage systems sometimes include rollback functions. The goal of conventional rollback functions is to allow access to a previous version of data subsequent an updating of such data.

There are two main types of rollback functions in conventional file systems. The first type of rollback function creates a snapshot in the file system, and in response to rollback request, makes rollback to the time at which the snapshot was created. Unfortunately, rollback can only be made to the exact point in time of the snapshot, if a snapshot was even created. The second type of rollback function records the state of a file at a commit point of the file. Such a function is sometimes implemented by a Copy-On-Write of a data block and a meta-data block. In such an implementation, the meta-data block is consumed each time a file is updated, and as a result, in most cases, the meta-data is updated only at a commit point (file close) of a file to reduce the space of consumption of a disk medium. Accordingly, in response to receiving a rollback request, rollback is only possible to the state of the file system at the commit point.

A rollback function is also supported by LTFS, described above, e.g., with reference to FIG. 9. Again, data cannot be overwritten on the tape, and so LTFS rewrites data by appending updated data to already-written data, and using meta-data to indicate how the updated data fits in the existing data, e.g., as a replacement of a portion of the existing data, an addition to the existing data, etc. LTFS can perform rollback to meta-data (index) written at a certain time as a commit point in LTFS. Rollback in LTFS is performed by reading an index of the tape. Accordingly, rollback can only be performed to a commit point, e.g., end of a file.

Embodiments of the present invention described herein use an operation journal to enable rollback to a requested point in time on a sequential storage medium. In some approaches, rollback may be made to essentially an arbitrary time of a user's selection. Moreover, rollback may be performed even within unfinished files in LTFS in some approaches.

Figure 10:
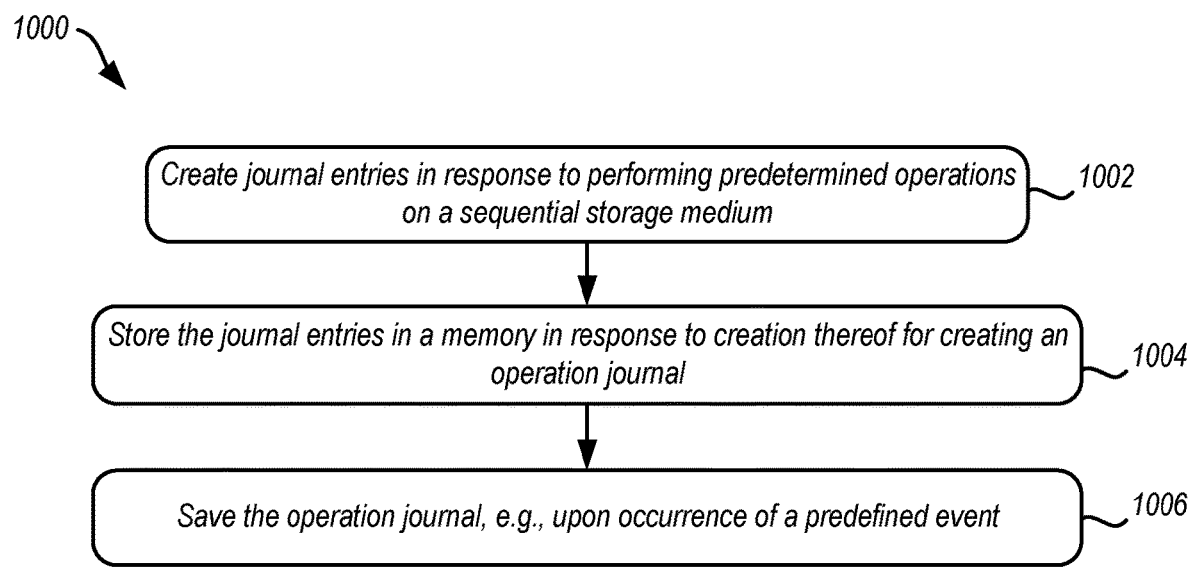
FIG. 10 illustrates a flowchart of a method, in accordance with one embodiment.

Now referring to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, and/or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

According to various embodiments, method 1000 may be used for creating an operation journal that enables rollback to a requested point in time on a sequential storage medium. The requested point in time may correspond to a data location between a first index and a second index, e.g., in a data partition of a magnetic recording tape such as between Index 2 and Index 3 in FIG. 9.

The type of sequential storage medium may vary depending on the embodiment. According to one approach, the sequential storage medium may be a magnetic recording tape, where data is written by appending the data to previously-written data. According to another approach, the sequential storage medium may be an optical medium, where data is written by appending the data to previously-written data.

Operation 1002 of method 1000 includes creating journal entries in response to performing predetermined operations on a sequential storage medium. The journal entries may include any type and/or amount of information that may be used to perform a subsequent rollback operation on a sequential storage medium to a specific point in time, e.g., in response to receiving a request to perform the rollback operation. Using the journal entries for performing a rollback operation on a sequential storage medium to a specific point in time will be described elsewhere herein, e.g., see method 1200.

According to various embodiments, the predetermined operations may include any type of predesignated operations. According to various approaches, predetermined operations may include read and/or write operations. According to other approaches, predetermined operations may additionally and/or alternatively include any one or more of the following operations, among others:
creating a new data file [e.g., creat( )]
making a directory [e.g., mkdir( )]
unlinking a file/directory [e.g., unlink( )]
renaming a file [e.g., rename( )]
changing permission parameters of a file [e.g., chmod( )]
closing a file [e.g., close( )]
setting an extended attribute value to a file/pointer [e.g., setxattr( )]
removing an extended attribute value from a file/pointer [e.g., removexattr( )]
changing the last access time of a file
changing the last modification time of a file [e.g., utime( )/utimes( )]
addition of extent to file
a predetermined iteration of a particular operation occurring, e.g., in response to a write command being issued to the tape a predetermined number of times
expiration of a timer or reaching a recurring count, such that a journal entry is created periodically, thereby defining a resolution of the journal entries, e.g., a journal entry is created each 60 seconds According to another embodiment, journal entries may be created in response to operations being performing on a predetermined portion of the sequential storage medium. For example, according to one approach, journal entries may be created in response to operations being performing on the sequential storage medium at a location before and/or after, e.g., a first index in a data partition of the sequential storage medium, a third index in the data partition of the sequential storage medium, a predetermined and/or known location on the sequential storage medium, etc.

The journal entries may include information corresponding to contents on the sequential storage medium after a predetermined operation is performed. Various examples of such information which may be captured upon performance of a corresponding operation are included in the following bullet points:
creat( ): meta-data such as: an i-node of target directory, an i-node of a created file, a file name, a time stamp, etc.
mkdir( ): meta-data such as: an i-node of a target directory, an i-node of a created directory, a directory name, a time stamp, etc.
unlink( ): an i-node of a deleted node
rename( ): meta-data such as: an i-node of an operated node, a destination i-node, a file name, a directory name, a time stamp, etc.
chmod( ): meta-data such as: an i-node of an operated node, a file name, a directory name, a time stamp, etc.
close( ): meta-data such as: an i-node of an operated file, a file name a time stamp, etc.
setxattr( ): meta-data such as: an i-node of an operated node, a file name, a time stamp, etc.
removexattr( ): meta-data such as: an i-node of an operated node, a file name, a time stamp, etc.
addition of extent to file: an i-node of an operated file, extent information, etc.
write command to tape
Location information of data of at least one file written between indices, e.g., a first index and a second index of the sequential storage medium
time stamps corresponding to the data locations
operation types: which operations were previously performed on the sequential storage medium, an ordering in which any previous operations were performed, etc.

Operation 1004 of method 1000 includes storing the journal entries in a memory in response to creation thereof. According to various embodiments, the journal entries may be stored in any memory. According to one embodiment, the journal entries may be stored on a controller of a system in which method 1000 is being performed, e.g., a tape drive, an optical drive, etc. According to another embodiment, the journal entries may be stored in the memory of a storage system manager or a host coupled to a drive. According to yet another embodiment the journal entries may additionally and/or alternatively be output and stored at a location that is not physically local to the sequential storage medium, e.g., in a cloud memory.

The journal entries, or portions thereof, may be added directly to an operation journal in the memory as they are created. In another approach, the stored journal entries may be used later for creating an operation journal.

In a preferred embodiment, the resulting operation journal is simply a collection of the stored journal entries. In some approaches, entireties of the journal entries may be added to the operation journal.

According to other approaches, the operation journal may include any information included in and/or derived from the journal entries, where such information may be used to perform a subsequent rollback operation on a sequential storage medium to a specific point in time in response to receiving a request to perform the rollback operation. Moreover, information not found in the journal entries may also be added to the operation journal.

According to one approach, the operation journal may include time stamp information. For example, the operation journal may include a time stamp for each journal entry. According to another approach, the operation journal may additionally and/or alternatively include operation type information. According to another approach, the operation journal may additionally and/or alternatively include information corresponding to an end point position of data (EOD) on the sequential storage medium at a point in time corresponding to each time stamp. For example, the EOD position of the sequential storage medium may be derived from linear position (LPOS) information indicating physical location on the sequential storage medium. According to yet another approach, the operation journal may additionally and/or alternatively include information corresponding to an operation target of the sequential storage medium, e.g., an i-node.

It should be noted that in LTFS, meta-data blocks may not be stored for each file in some approaches. Accordingly, in response to recording EOD on the sequential storage medium at a point in time corresponding to the time stamp, it is possible to maintain the space consumed by the operation journal on the sequential storage medium relatively small by recording the position of the EOD when the meta-data of an arbitrary file is changed. By maintaining a relatively small operation journal size, more space on the sequential storage medium is thereby available for data storage.

Operation 1006 of method 1000 includes saving the operation journal. For example, the operation journal may be saved upon occurrence of a predefined event. According to various embodiments, the operation journal may be saved to any one or more locations. For example, the operation journal may be saved on the sequential storage medium and/or a controller memory, etc.

According to one approach, the predefined event may include writing a next index to the sequential storage medium. According to another approach, the predefined event may additionally and/or alternatively include an unmounting of the sequential storage medium. According to another approach, the predefined event may additionally and/or alternatively include an unloading of the sequential storage medium, e.g., from a drive. According to another approach, the predefined event may additionally and/or alternatively include a scheduling of an unloading of the sequential storage medium. According to yet another approach, the predefined event may additionally and/or alternatively include a predetermined iteration of a particular operation occurring.

In one approach, the operation journal may additionally and/or alternatively be saved with an index corresponding to the data written to the sequential storage medium during the predetermined operations. For example, the operation journal may be temporally saved with an index corresponding to the data written to the sequential storage medium during the predetermined operations. According to another approach, the operation journal may additionally and/or alternatively be contiguously saved with an index corresponding to the data written to the sequential storage medium during the predetermined operations. For example, the operation journal may be saved near or directly next to the index, but not integrally therewith. According to another example, the operation journal may be saved near or directly next to a tail of an index of the sequential storage medium. It should be noted that in such approaches, the operation journal may be saved on either side of the index, e.g., before or after the index with respect to the direction of sequential storage medium travel. According to another approach, the operation journal may additionally and/or alternatively be integrally saved with an index corresponding to the data written to the sequential storage medium during the predetermined operations.

According to another embodiment, the operation journal may be saved separately from an index corresponding to the data written to the sequential storage medium during the predetermined operations. According to one approach, the operation journal may be saved non-contiguously from an index corresponding to the data written to the sequential storage medium during the predetermined operations. According to another approach, the operation journal may additionally and/or alternatively be saved in another location than an index corresponding to the data written to the sequential storage medium during the predetermined operations. For example, according to a further embodiment, the operation journal may be output and stored at a location that is not physically local to the sequential storage medium, e.g., in a cloud memory, a host memory, a storage controller memory, a remote database, etc.

According to yet another approach, the operation journal may additionally and/or alternatively be saved in accordance with Extensible Markup Language (XML) formatting. In LTFS, an index may be enclosed by file marks and moreover be written in XML. The grammar of XML may be defined in the LTFS Format Specification. In the present approach, the operation journal may be saved to the index with the information of the operation journal embedded in XML, and/or saved on the sequential storage medium before or after the index.

According to one approach, when the operation journal is saved by embedding the operation journal in XML, a new tag can be defined and embedded on the sequential storage medium. The new tag may prevent any conflict with LTFS Format Specification. Since LTFS Format Specification may recommend saving unknown tags, the current approach enables verification of whether or not the operation journal embedded in the index is effective by comparing a time of the operation journal and a time of the immediately preceding index at a time of reading.

According to various embodiments, a rollback may be performed to a requested point in time using the saved operation journal. For example, using information of the operation journal, a rollback may be performed to a requested point in time corresponding to a data location between a first index and a second index on a sequential storage medium.

Performing a rollback to a requested point in time will be described in greater detail elsewhere herein, however it is worth prefacing that method 1000 and/or other embodiments described herein may enable such rollback.

Figure 11:
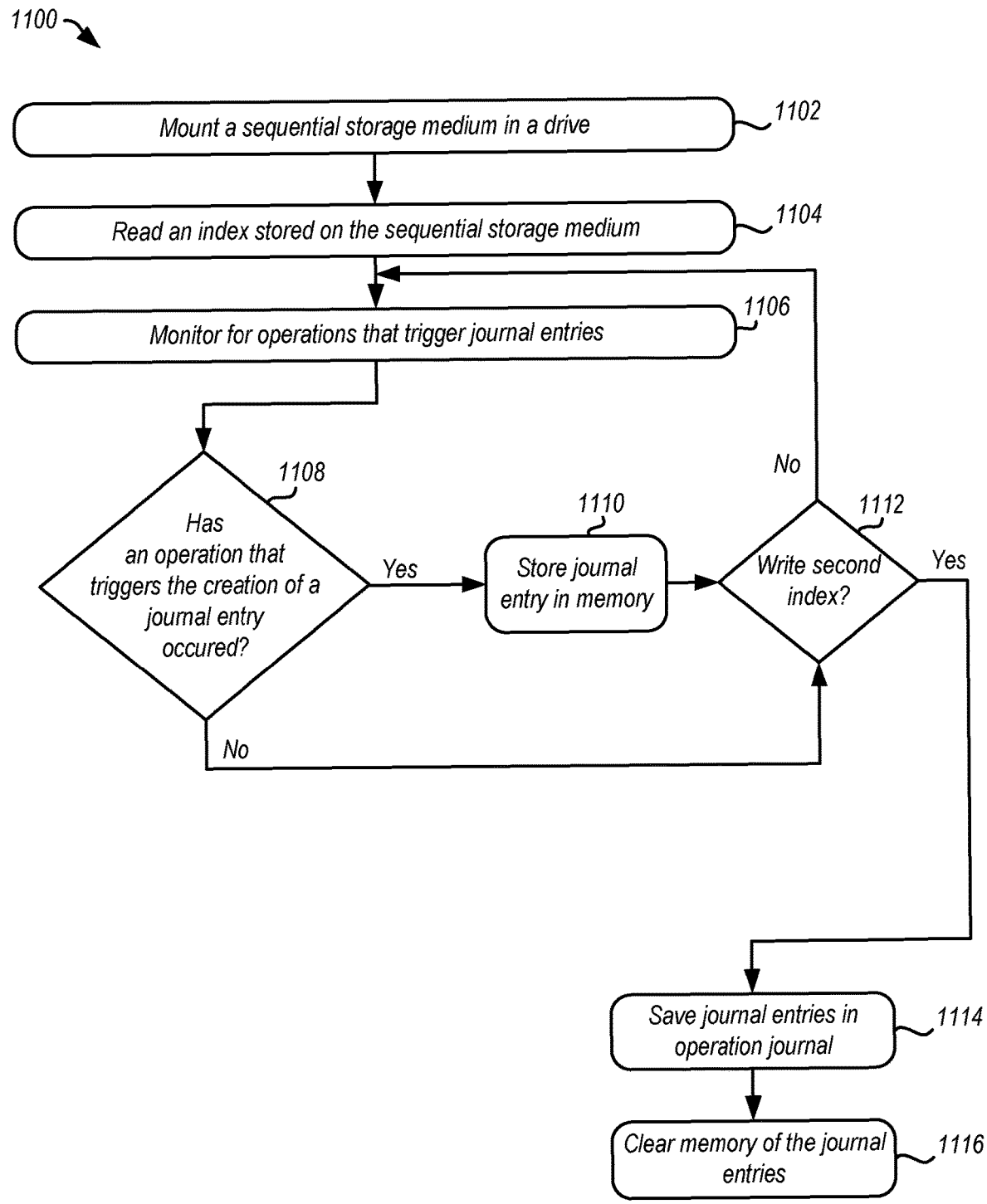
FIG. 11 illustrates a flowchart of a method, in accordance with one embodiment.

Now referring to FIG. 11, a flowchart of a method 1100 for in use enablement of rollback to a requested point in time on a sequential storage medium is shown according to one embodiment. The method 1100 may be performed in accordance with the present invention in any of the environments depicted in FIGS. 1-9, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, and/or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

Operation 1102 of method 1100 includes mounting a sequential storage medium in a drive.

Operation 1104 of method 1100 includes reading an index stored on the sequential storage medium. According to one embodiment, the index may be read from a data partition of the sequential storage medium. According to another embodiment, the index may be read from an index partition of the sequential storage medium. According to yet another embodiment, the index may be read from both the index partition and the data partition of the sequential storage medium.

Preferably, the index that is read is the most recently written index on the sequential storage medium. However, in some cases, the index that is read may be an index other than the most recently written index on the sequential storage medium.

According to one approach, the current index may be stored in a memory during mounting of the sequential storage medium. If an existing operation journal is present in the index, the operation journal may also be stored in the memory, or skipped. If the operation journal is stored in the memory, the operation journal may be cleared from the memory upon completion of mounting the sequential storage medium. This is because the operation journal includes the entries corresponding to data written between the current index and the index written prior to the current index (e.g., between Index 2 and Index 3 of FIG. 9, where Index 3 is the current index).

Conventional operations are performed on the sequential storage medium, such as write operations, read operations, etc.

Operation 1106 of method 1100 includes monitoring for operations that trigger journal entries. According to various embodiments, operations that trigger journal entries may include any predetermined operations. Various predetermined operations that trigger the creation of journal entries have been described elsewhere herein, e.g., see operation 1002 of method 1000. In addition, predetermined operations may include passage of predetermined amount of time since creation of a last journal entry.

Decision 1108 of method 1100 includes determining if an operation that triggers a journal entry has occurred.

In response to determining that an operation that triggers a journal entry has occurred (as illustrated by the "Yes" logical path loading from decision 1108) a journal entry may be stored in memory, e.g., see operation 1110. The journal entry may be stored in any memory location. Various approaches of memory locations and/or types have been described elsewhere herein, e.g., see the descriptions of similar operation 1004 of method 1000.

With continued reference to method 1100, in response to determining that an operation that triggers a journal entry has not occurred (as illustrated by the "No" logical path loading from decision 1108), it may be determined if a second index is to be written to the sequential storage medium, e.g., in response to an unmount command. See decision 1112.

In response to determining that it is not time to write the second index to the sequential storage medium (as illustrated by the "No" logical path loading from decision 1112), monitoring continues for operations that trigger journal entries, e.g., see operation 1106.

In response to determining that the second index is to be written to the sequential storage medium (as illustrated by the "Yes" logical path loading from decision 1112), the journal entries may be saved in an operation journal, e.g., see operation 1114. The operation journal may be saved to any one or more locations as described elsewhere herein, e.g., see the descriptions of operation 1006 of method 1000.

Operation 1116 of method 1100 includes clearing the memory of the journal entries, e.g., in response the operation journal being saved, thereby freeing the memory space.

Using the operation journal, a rollback may be performed to a requested point in time of the sequential storage medium. Rolling back to a requested point in time on a sequential storage medium will now be discussed below.

Figure 12:
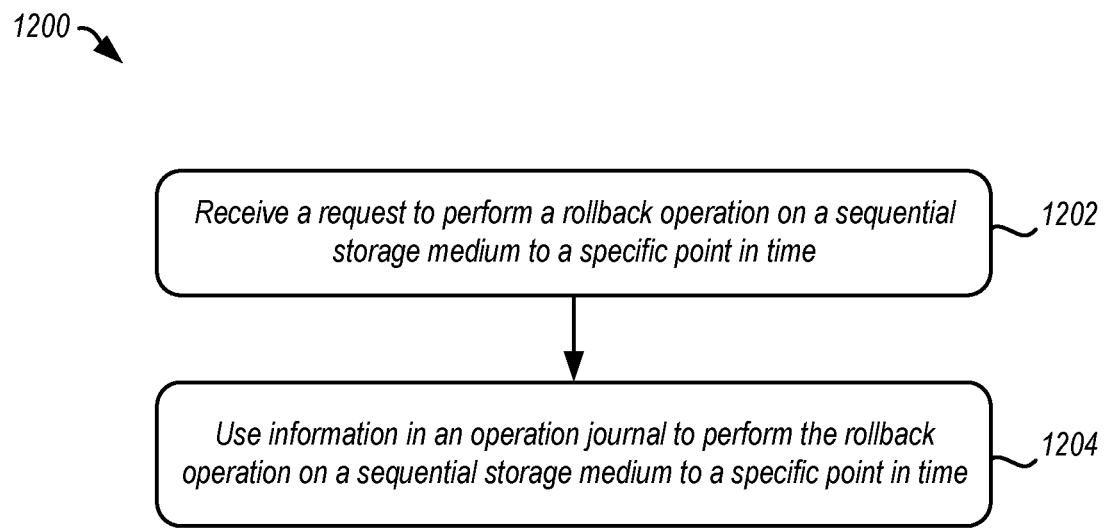
FIG. 12 illustrates a flowchart of a method, in accordance with one embodiment.

Now referring to FIG. 12, a flowchart of a method 1200 for rolling back to a requested point in time on a sequential storage medium, where data is written by appending the data to previously-written data is shown according to one embodiment. The method 1200 may be performed in accordance with the present invention in any of the environments depicted in FIGS. 1-9, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, and/or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

In operation 1202 of method 1200, a request to perform a rollback operation is received, e.g., from a host, from a user, from a library controller, etc. The request to perform the rollback operation may include relevant information corresponding to the desired rollback, such as an identity of the sequential storage medium, designation of when to rollback to (e.g., a specified point in time, to the end of a specified file on the medium, etc.), etc.

The specified point in time may include a date and time that correspond to a specific point on the sequential storage medium between a first index and a second index which was written at about that particular point in time. For example, the specified point in time may correspond to an end of file. Moreover, the requested point in time may correspond to a specific point on the sequential storage medium in the middle of a file, and thus to where a file has been partially written. Accordingly, in LTFS for example, a halfway state of an unfinished file at an arbitrary time from the position of EOD may be restored at an essentially arbitrary time.

Referring to operation 1204, in response to receiving the request to perform the rollback operation, information in an operation journal is used to perform a rollback operation on a sequential storage medium to a specific point in time, e.g., to reproduce a state of a filesystem of the sequential storage medium at a specific point in time corresponding closely to the time specified in the request. In one approach, the operation journal may be searched for a timestamp nearest in time to the time specified in the request, a timestamp immediately before or after the time specified in the request, etc. The journal entries starting from the previous index to the journal entry having the selected timestamp may be stepped through sequentially to trace the progression of writing up to the point of rollback. The resolution of where the file system may be rolled back to may be dependent upon parameters such as how many journal entries were created, the frequency in which the journal entries were created, etc.

Upon determining the state of the file system at the specific point in time, metadata may be created to reflect the state of the file system to the specific point in time.

According to an exemplary embodiment, in response to receiving a request to perform a rollback operation, method 1200 may include reading a first index, e.g., index #m, preceding the data that corresponds to the specific point in time on the sequential storage medium. The operation journal at the subsequent index #m+1 is also read. The journal entries in the operation journal are stepped through from a beginning thereof to the specific point in time corresponding most closely to the request to perform the rollback operation. Then, using the information from index #m and the information derived from stepping through the journal entries, an index corresponding to the state of the filesystem at the specific point in time may be created and stored. This new index corresponds to the state of the filesystem at the specific point in time, allowing the state of the filesystem at the specific point in time to be recreated and available for accessing.

A tape drive may perform this method 1200 autonomously in response to receiving the request, under control of an external controller or host, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
creating journal entries in response to performing predetermined operations on a sequential storage medium, the sequential storage medium including at least a first index,
wherein the journal entries include information corresponding to data contents on the sequential storage medium subsequent to the predetermined operations being performed;
storing the journal entries in a memory in response to creation thereof for creating an operation journal;
adding, to the operation journal, metadata that is different than the information corresponding to data contents on the sequential storage medium;
upon occurrence of a predefined event, writing the operation journal to the sequential storage medium, wherein the operation journal includes a time stamp for each journal entry;
writing a second index to the sequential storage medium, wherein the operation journal is written to the sequential storage medium prior to the second index being written to the sequential storage medium,
wherein the operational journal is stored contiguously but not integrally with the second index; and
using information in the operation journal to perform a rollback operation to a specific point in time in response to receiving a request to perform the rollback operation,
wherein the specific point in time corresponds to a data location on the sequential storage medium,
wherein the data location is between the first index and the second index,
wherein performing the rollback operation results in a reproduction of a previous state of a filesystem of the sequential storage medium at the specific point in time, wherein the previous state of the filesystem of the sequential storage medium includes a halfway state of an unfinished file.

2. The computer-implemented method as recited in claim 1, wherein one of the predetermined operations includes expiration of a timer such that the operation journal is created at least periodically.

3. The computer-implemented method as recited in claim 1, wherein the operation journal includes information corresponding to an end point position of data on the sequential storage medium at a point in time corresponding to the time stamp.

4. The computer-implemented method as recited in claim 1, comprising: saving the operation journal to a controller memory.

5. The computer-implemented method as recited in claim 4, comprising:
wherein at least one of the predetermined operations includes expiration of a timer such that the operation journal is created at least periodically,
wherein the predefined event includes scheduling an unloading of the sequential storage medium,
wherein the second index is written to the sequential storage medium in response to receiving an unmount command.

6. The computer-implemented method as recited in claim 1, wherein at least one of the predetermined operations includes an operation being performed on a predetermined portion of the sequential storage medium, wherein the predetermined portion of the sequential storage medium includes a predetermined index in a data partition of the sequential storage medium.

7. The computer-implemented method as recited in claim 1, comprising:
reading the first index;
reading the operation journal;
stepping through journal entries from a beginning thereof to the specific point in time;
creating a third index corresponding to a state of a filesystem at the specific point in time; and
storing the third index to the sequential storage medium.

8. A computer program product, the computer program product comprising a computer readable storage medium having program instructions embodied therewith, wherein the computer readable storage medium is not a transitory signal per se, the program instructions readable and/or executable by a controller to cause the controller to perform a method comprising:
creating, by the controller, journal entries in response to performing predetermined operations on a sequential storage medium, the sequential storage medium including at least a first index;
adding to the journal entries, by the controller, information corresponding to data contents on the sequential storage medium in response to the predetermined operations being performed;
storing, by the controller, the journal entries in a memory in response to creation thereof for creating an operation journal;
adding to the operation journal, by the controller, metadata that is different than the information corresponding to data contents on the sequential storage medium;
creating, by the controller, a second index;
saving, by the controller, the second index to the to the sequential storage medium;
saving, by the controller, the operation journal to the sequential storage medium upon occurrence of a predefined event,
wherein the operation journal is written to the sequential storage medium after the second index is written to the sequential storage medium,
wherein the operational journal is stored contiguously but not integrally with the second index; and
using, by the controller, information in the operation journal to perform a rollback operation to a specific point in time in response to receiving a request to perform the rollback operation,
wherein the rollback operation results in a reproduction of a previous state of a filesystem of the sequential storage medium at the specific point in time.

9. The computer program product as recited in claim 8, comprising saving, by the controller, the operation journal to a cartridge memory.

10. The computer program product as recited in claim 8, wherein the operation journal includes information corresponding to an end point position of data on the sequential storage medium at a point in time corresponding to the time stamp.

11. The computer program product as recited in claim 8, wherein the predefined event includes scheduling an unloading of the sequential storage medium.

12. The computer program product as recited in claim 11, wherein the specific point on the sequential storage medium is between the first index and the second index.

13. The computer program product as recited in claim 8, comprising:
reading, by the controller, the first index;
reading, by the controller, the operation journal;
stepping, by the controller, through journal entries from a beginning thereof to the specific point in time;
creating, by the controller, a third index corresponding to a state of a filesystem at the specific point in time; and
storing, by the controller, the third index to the sequential storage medium.

14. The computer program product as recited in claim 8,
wherein at least one of the predetermined operations includes expiration of a timer such that the operation journal is created at least periodically,
wherein the predefined event includes scheduling an unloading of the sequential storage medium,
wherein the second index is written to the sequential storage medium in response to receiving an unmount command,
wherein the specific point on the sequential storage medium is between the first index and the second index, and comprising:
reading, by the controller, the first index;
reading, by the controller, the operation journal;
stepping, by the controller, through journal entries from a beginning thereof to the specific point in time;
creating, by the controller, a third index corresponding to a state of a filesystem at the specific point in time; and
storing, by the controller, the third index to the sequential storage medium.

15. A computer-implemented method, comprising:
creating journal entries in response to performing predetermined operations on a non-transitory sequential storage medium,
wherein at least some of the journal entries are created at a periodic interval, wherein the journal entries include information corresponding to data contents on the sequential storage medium subsequent to the predetermined operations being performed;

storing the journal entries in a memory in response to creation thereof for creating an operation journal;

adding, to the operation journal, metadata that is different than the information corresponding to data contents on the sequential storage medium;

upon occurrence of a predefined event, saving the operation journal to the sequential storage medium, wherein the operational journal is stored contiguously but not integrally with an index of the sequential storage medium; and using information in the operation journal to perform a rollback operation on the sequential storage medium to a specific point in time in response to receiving a request to perform the rollback operation, wherein the rollback operation results in a reproduction of a previous state of a filesystem of the sequential storage medium at the specific point in time.

16. The computer-implemented method as recited in claim 15, wherein the information in the operation journal includes locations of data of at least one file written between indices, time stamps corresponding to the data locations, and operation types.

17. The computer-implemented method as recited in claim 15, comprising: reading a first index preceding data that corresponds to the specific point in time; reading the operation journal; stepping through journal entries from a beginning thereof to the specific point in time; creating an index corresponding to a state of a filesystem at the specific point in time; and storing the index corresponding to the state of the filesystem at the specific point in time.

18. The computer-implemented method as recited in claim 17, comprising saving the operation journal to a cartridge memory in response to receiving a command to unmount the sequential storage medium.

* * * * *